United States Patent
Rekieta et al.

[11] Patent Number: 5,890,156
[45] Date of Patent: Mar. 30, 1999

[54] DISTRIBUTED REDUNDANT DATABASE

[75] Inventors: Thomas W. Rekieta, McKinney; James R. Vatteroni, Wylie; Chyuan-Meei Chen, Plano, all of Tex.; Rashmi K. Kasam, Atlanta, Ga.; Walter C. Robertson, Richardson, Tex.

[73] Assignee: Alcatel USA, Inc., Plano, Tex.

[21] Appl. No.: 640,544

[22] Filed: May 2, 1996

[51] Int. Cl.⁶ .................................................. G06F 17/30
[52] U.S. Cl. ................................ 707/10; 707/8; 707/9; 707/200
[58] Field of Search .................................... 395/608, 620, 395/200, 712; 707/10, 8, 9, 200

[56] References Cited

U.S. PATENT DOCUMENTS

| | | | |
|---|---|---|---|
| 5,008,929 | 4/1991 | Olsen et al. | 379/112 |
| 5,146,561 | 9/1992 | Carey et al. | 395/200 |
| 5,285,494 | 2/1994 | Sprecher et al. | 379/59 |
| 5,315,636 | 5/1994 | Patel | 379/58 |
| 5,394,526 | 2/1995 | Crouse et al. | 395/200 |
| 5,594,903 | 1/1997 | Bunnell et al. | 395/712 |
| 5,619,691 | 4/1997 | Katada et al. | 395/620 |
| 5,640,442 | 6/1997 | Fitgerald et al. | 379/57 |
| 5,713,017 | 1/1998 | Lin et al. | 395/608 |

OTHER PUBLICATIONS

Compaq Computer A/S, "Compaq ProLiant 4500 Servers" brochure, no date.

Primary Examiner—Wayne Amsbury
Assistant Examiner—Cheryl Lewis
Attorney, Agent, or Firm—Baker & Botts, L.L.P.

[57] ABSTRACT

A distributed redundant database architecture (10) primarily for storing a plurality of wireless service subscriber files (84, 86) is provided. The database architecture (10) include a first set of processors (44 46, 48) each having a shared memory (72, 74, 76), where the processors (44, 46, 48) are divided into processor groups (38, 40, 42). A memory storage device (80, 82) is coupled to each processor group (38, 40, 42) in a multi-initiator mode so that each memory storage device (80, 82) is accessible by the processors (44, 46, 48) in its respective processor group (38, 40, 42). The plurality of subscriber files (84, 86) are assigned to the processor groups (38, 40, 42) and further assigned to the processors (44, 46, 48) in each processor group (38, 40, 42) to achieve a substantially even distribution. The plurality of subscriber files are stored in the memory storage devices (80, 82) of respective assigned processor groups (38, 40, 42), and are mapped into the respective shared memories (72, 74, 76) of the processors. A database manager (52, 54, 66) associated with the processors and processor groups is provided for managing the distribution and redistribution of the subscriber files to the processors. A second set of similarly configured processors residing at a remote site (14) maintains a second copy of the subscriber files (84, 86) to provide database backup.

49 Claims, 10 Drawing Sheets

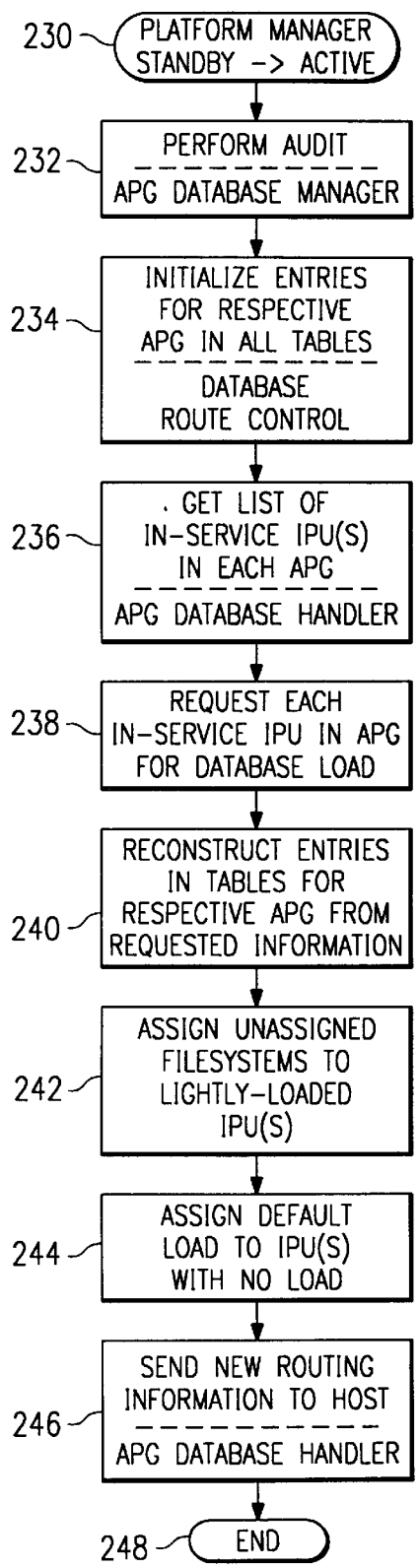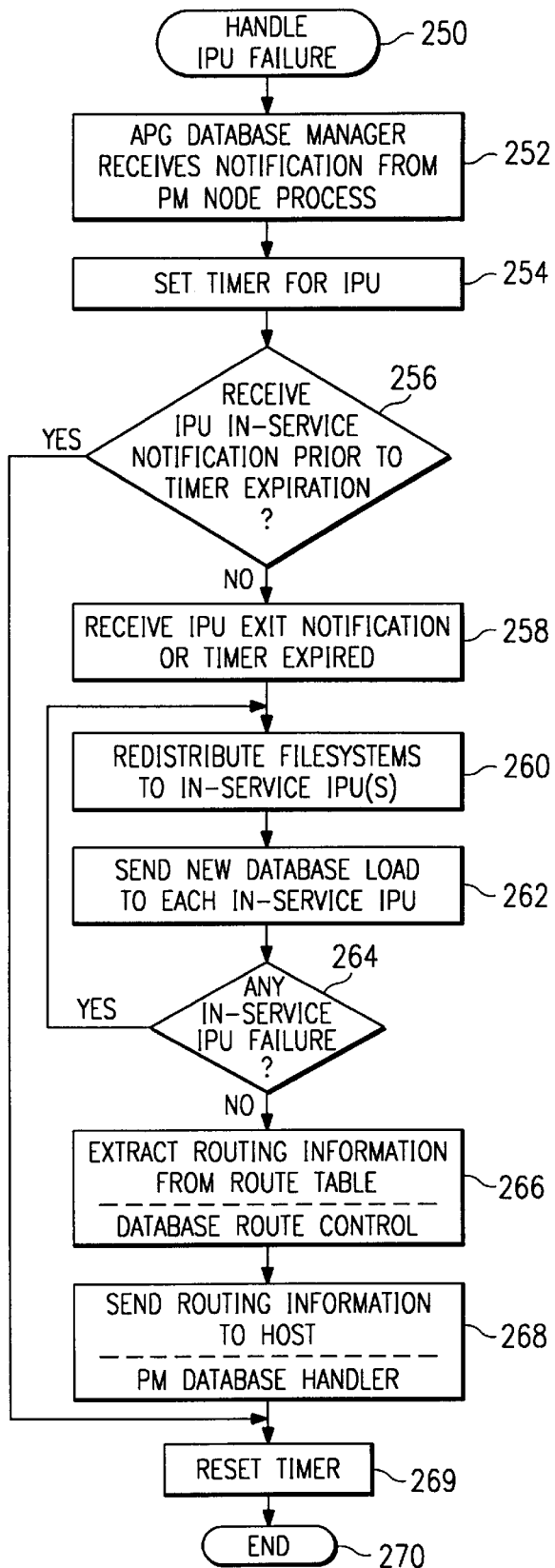

DISTRIBUTED REDUNDANT DATABASE

RELATED PATENT APPLICATION

This patent application is related to a co-pending U.S. patent application, Ser. No. 08/526,953, titled System and Method for Multi-Site Distributed Object Management Environment.

TECHNICAL FIELD OF THE INVENTION

This invention is related in general to the field of telecommunications equipment. More particularly, the invention is related to a distributed redundant database system for a wireless communications network.

BACKGROUND OF THE INVENTION

In a wireless communications network, voluminous information is maintained about subscribers' wireless service subscription, such as service options, preference information, billing information, and current location. All of this information is stored and maintained in a subscriber database. In a system supporting tens of millions of wireless service subscribers, the subscriber database attains a very considerable size.

Coupled to the size requirement of the database is a speed requirement. The information related to each of the tens of millions of subscribers must be readily accessible, as soon as a subscriber turns on the personal handset to make a telephone call. Further, because of the substantial number of subscribers, the number of database queries and updates can become unmanageable if the database is not properly designed and configured.

In addition, it is desirable that the subscriber database be able to withstand system and component failures to a certain extent so that disruption to subscriber services is at a minimum, if at all.

SUMMARY OF THE INVENTION

Accordingly, there is a need for a subscriber database for a wireless communications network that is capable of storing a large amount of subscriber data, providing fast and numerous access of specific subscriber records, and withstanding certain failures.

In accordance with the present invention, a distributed redundant database system and methods therefor are provided which eliminate or substantially reduce the disadvantages associated with prior systems.

In one aspect of the invention, a distributed redundant database architecture primarily for storing a plurality of wireless service subscriber files is provided. The database architecture includes a first set of processors each having a shared memory, where the processors are divided into processor groups. A memory storage device is coupled to each processor group in a multi-initiator mode so that each memory storage device is accessible by the processors in its respective processor group. The plurality of subscriber files are assigned to the processor groups and further assigned to the processors in each processor group to achieve a substantially even distribution. The plurality of subscriber files are stored in the memory storage devices of respective assigned processor groups, and are mapped into the respective shared memories of the processors. A database manager associated with the processors and processor groups is provided for managing the distribution and redistribution of the subscriber files to the processors.

In another aspect of the invention, a distributed redundant database architecture for a wireless communications network includes first and second service control points, each service control point servicing one half of wireless service subscribers. The service control points are configured similarly, where each service control point includes a first set of processors each having a shared memory. The processors are divided into processor groups. A pair of mirrored memory storage devices is coupled to each processor group in a multi-initiator mode. A plurality of subscriber files are assigned to the processor groups and further to the processors in each processor group to achieve a substantially even distribution. The plurality of subscriber files are stored in the mirrored memory storage devices of respective assigned processor groups, and are further mapped into the respective shared memories of the processors. A database manager associated with the processors, processor groups, and service control point is provided for managing the distribution of the plurality subscriber files to the processors.

In yet another aspect of the invention, a method for organizing data storage and access in a database is provided. The data in the database are first organized into a plurality of files, each file having a file index associated therewith. The plurality of files are assigned to the processor groups and further to the processors in each processor group in an evenly distributed manner. The assigned files are stored in the memory storage device of each processor group according to the assignment, and mapped from the memory storage device to a shared memory of each processor.

A technical advantage of the distributed redundant database is the capacity to store a large amount of data while still being able to search for and access specific data quickly. Another advantage stems from the distributed and redundant nature of the database architecture—the data stored therein is more secure and robust and able to withstand system and component failures to a certain extent.

BRIEF DESCRIPTION OF THE DRAWINGS

For a better understanding of the present invention, reference may be made to the accompanying drawings, in which:

FIG. 9 is an exemplary flowchart of a process in which a PM transitions from standby to active operating status;

FIG. 10 is an exemplary flowchart of a process for handling IPU failures;

DETAILED DESCRIPTION OF THE INVENTION

Figure 1:
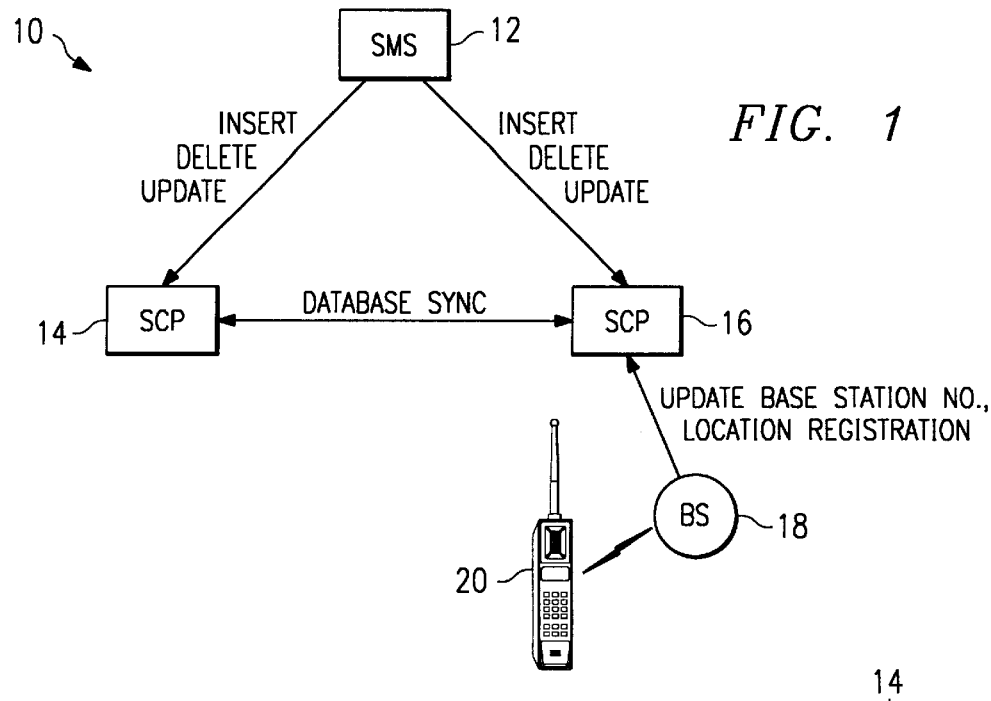
FIG. 1 is a simplified block diagram illustrating the relationship between a Service Management System (SMS), a Service Control Point (SCP) and its mate SCP, and a base station (BS) in wireless communication with subscribers' telephone equipment.

The preferred embodiment(s) of the present invention is (are) illustrated in FIGS. 1–19, like reference numerals being used to refer to like and corresponding parts of the various drawings.

FIG. 1 is a high-level block diagram of a distributed redundant database system and architecture 10 operating in a portion of a wireless communications network constructed and configured according to the teachings of the present invention. The wireless communications network includes a Service Management System (SMS) 12 in communication with two mate Service Control Points (SCPs) 14 and 16, which are also in communication with one another. SCPs 14 and 16 may be coupled to SMS 12 via dedicated point-to-point X. 25 links SCPs 14 and 16 are generally physically located in different cities and may be coupled together via some communications line such as a point-to-point wide area network (WAN) link or a Media Access Control (MAC) bridge. SCPs 14 and 16 operate in parallel and provide subscriber database functions for the wireless network by maintaining the subscriber database and additional databases necessary to provide the wireless communications services. The subscriber database is stored in both SCPs, where one SCP is the primary SCP for half of the subscribers, and the other SCP is the primary SCP for the remaining half of the subscribers. Updates of transient data related to the subscribers, such as current subscriber location, are routed to the primary SCP only, but the SCPs exchange updated transient data on a periodic basis to bring each other's database up to date. Static data updates, such as subscriber additions, deletions, and service modifications, are initiated by the SMS 12 to both SCPs 14 and 16 simultaneously. The database configuration of both SCPs are preferably exactly alike and the data contained therein nearly identical, so that in the event of one SCP failure, the other SCP is capable of taking over the operations of the entire database load.

A base station (BS) 18 is in communication with SCP 16, typically through a Signal Transfer Point (STP) not shown herein. Base station 18 may serve as a primary base station and SCP 16 as a primary SCP for a portable handset 20 belonging to a subscriber. Base Station 18 sends and receives messages to and from personal handset 20 for normal call processing functions and to determine user preference information. Service Control Point 16 interacts with Base Station 18 to support tasks such as portable handset information requests, location queries, location registrations, charge rates, and voice mail notification for the subscriber using portable handset 20.

Some exemplary messages that are transmitted between SMS 12, SCPs 14 and 16, and base station 18 are shown in FIG. 1. When a new subscriber using a portable handset 20 is being added to wireless communications network 10, SMS 12 issues an INSERT command to add a new unique personal subscriber number or telephone number to both SCPs 14 and 16. A subscriber who no longer desires wireless service can be deleted in a similar manner with DELETE messages to both SCPs 14 and 16. SMS 12 may also issue UPDATE messages to provide information, such as add a new service, to SCPs 14 and 16. These messages are examples of static data updates.

As a portable handset roams, its location may change from the coverage area of one base station to another. Updates of base station numbers are provided by the base station currently covering the portable handset to primary SCP 16, so that incoming calls to the portable handset can be routed to that base station. Further, outgoing calls to another portable handset may begin with a query to primary SCP 16 of the location registration of the destination portable handset. A database synchronization process is performed periodically and/or on demand between SCP 14 and 16 to update the respective copies of the SCPs with this transient data.

As referred to above, the respective copies of the subscriber database in SCP 14 and 16 are synchronized on a periodic basis. Database synchronization involves the transfer of records or files that have modified or new data to the mate SCP. If one SCP fails, its mate SCP has all the data necessary to continue the network operation of subscriber services performed by both SCPs, and all database queries and updates of transient data are subsequently routed to the remaining SCP for processing. Details of SCP database synchronization are set forth below.

Figure 2:
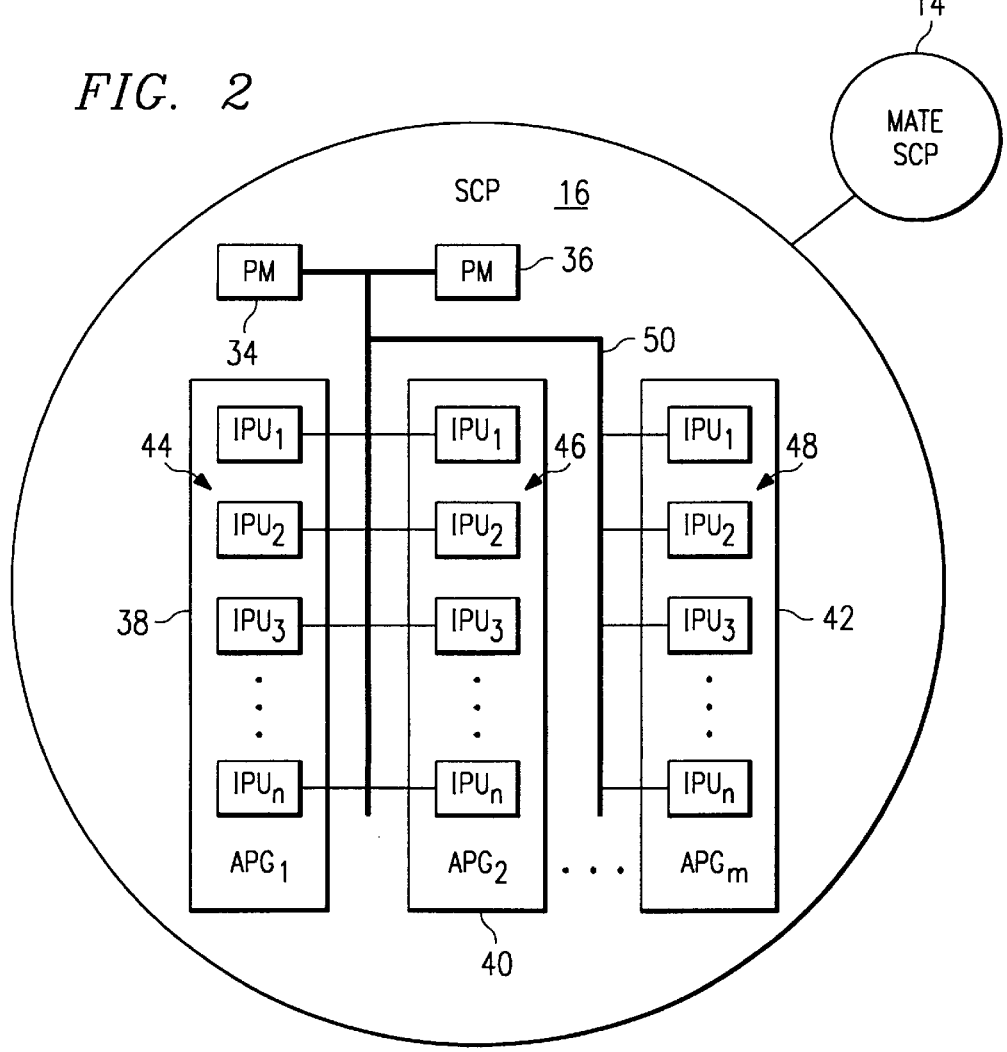
FIG. 2 is a block diagram of a Service Control Point (SCP) constructed according to the teachings of the present invention.

FIG. 2 provides a more detailed block diagram of a SCP 16 coupled to its mate SCP 14 constructed according to the teachings of the present invention. SCP 16 includes an active Platform Managers (PM) 34 and a standby Platform Manager 36 coupled by a bus, local area network (LAN), or a local area network hub 50 to a predetermined number of Application Processor Groups (APG$_1$–APG$_m$) 38–42. To provide greater network integrity and fault tolerance, dual LAN or hubs may be used to connect the PMs to the APGs to provide redundancy. Each APG 38–42 includes a plurality of Intelligent Processor Units (IPU$_1$–IPU$_n$) 44–48. One or more IPU may be configured as a spare or standby IPU that may be brought on-line as another IPU fails.

Figure 3:
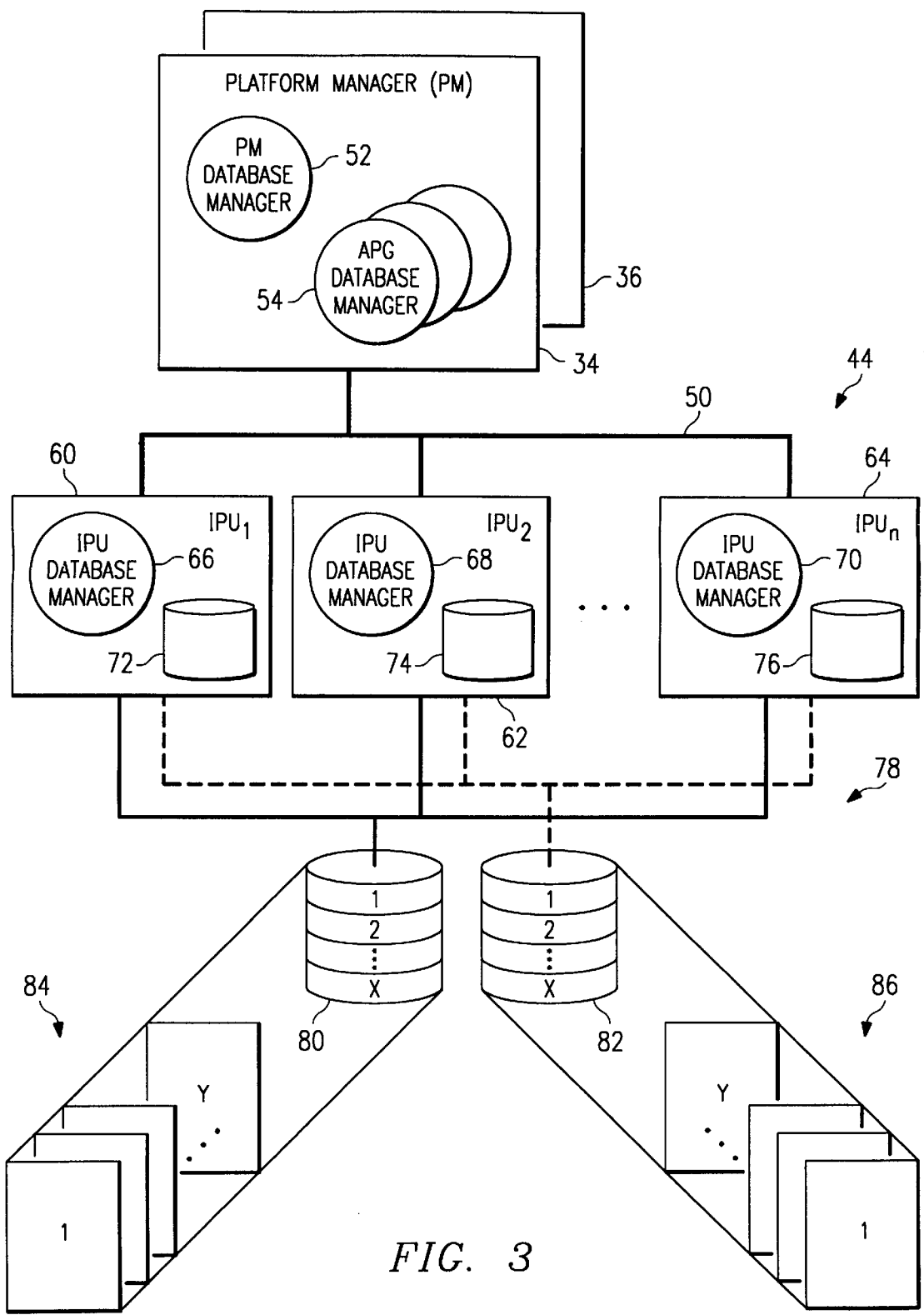
FIG. 3 is a more detailed block diagram of the SCP according to the teachings of the present invention.

Referring to FIG. 3, it may be seen that each Platform Manager 34 and 36 includes a PM Database Manager process 52 and an APG Database Manager process 54 for each APG. Each IPU$_{1-n}$ 60–64 also has an IPU Database Manager process 66–70 and shared memory 72–76 residing therein. Shared memory 72–76 may be implemented by any fast memory device, including random access memory (RAM) devices, and is accessible to all the processes residing in the IPUs. A pair of mirrored memory storage devices 80 and 82 are coupled to each IPU 60–64, where IPUs 60–64 may all access the memory storage devices 80 and 82 simultaneously. Simultaneous file access may be accomplished by implementing memory storage devices 80 and 82 with multi-port media, or by running IPUs 60–64 in a multi-initiator mode to each memory device 80 and 82.

Memory storage devices 80 and 82 may be implemented with solid state disks or any other suitable storage media. In the multi-initiator mode, memory storage devices 80 and 82 may each be coupled to IPUs 60–64 by a separate bus or Small Computer Systems Interface (SCSI). Constructed and configured in this manner, any one of IPUs 60–64 has access to both memory storage devices 80 and 82.

Memory storage devices 80 and 82 may be segmented into a predetermined partitions or filesystems, where X of them are used to store subscriber files. The portable handset subscriber database is comprised of a fixed number of files which are stored on mirrored disks of APGs 38–42 of SCP 30, where there is a pair of mirrored disks per APG. A subset of subscriber records in the entire subscriber database is assigned to each subscriber file. Each subscriber file is assigned to be stored in a specific filesystem on a specific pair of mirrored disks in the SCP, such that each APG services an exclusive subset of the subscriber database. As shown in FIG. 3, the number of files that may be stored on a pair of disks is Y. The pair of disks are mirrored, so that the contents of the disks, if both are operational, are always the same.

To access a particular file on a given pair of disks, the filesystem containing that file has to be mounted to a directory on an IPU in the APG, where a filesystem can be mounted on only one IPU at a time. When a filesystem is mounted on an IPU, its files are mapped into the shared memory of the IPU. During typical operations, each filesystem is assigned to a particular IPU and is mounted and mapped into the shared memory of the IPU so that the data contained therein is readily accessible to all the processes operating in the IPU. Transient data updates containing subscriber location information and the like are made only to the shared memory of the IPU, but static data updates such as subscriber additions, deletions, or service modifications, are written immediately out to disk as well as updated in the shared memory. On an ongoing basis, configurably-sized sections of the files mapped to an IPU's shared memory, including transient data updates, are written out to the mirrored disks simultaneously to update the copy contained therein. The result of this ongoing write operation is to continuously cycle through the mapped shared memory files at a configurable interval so that no excessive input/output or CPU peaks are required to update the disk copies. Thus, possible intermittent service delays are avoided by the continuous writing of small sections of the files to disk.

Figure 3A:
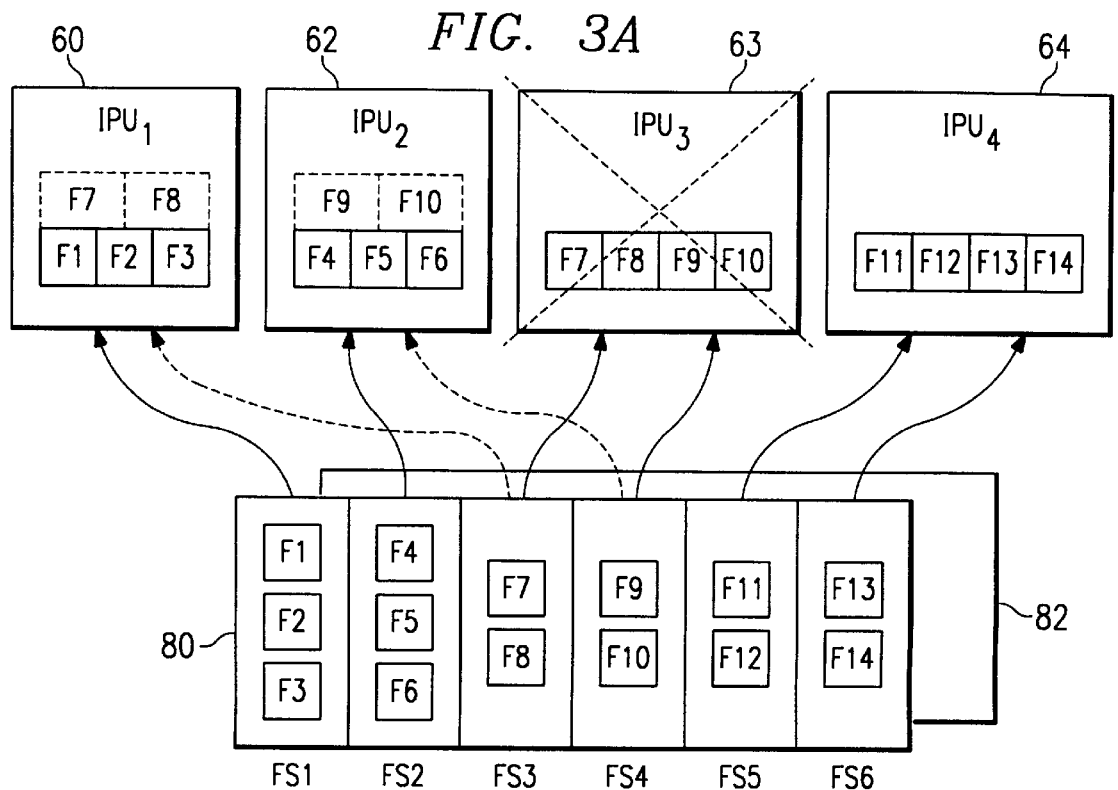
FIG. 3A is a more detailed block diagram of file distribution and redistribution due to IPU failure according to the teachings of the present invention.

Referring to FIG. 3A, an exemplary block diagram of file distribution and redistribution to the IPUs in an APG is shown. If disks 80 and 82 each have six partitions or filesystems FS1–FS6, for example, each filesystem may have two or three files, F1–F14. In an initial distribution of the files, IPU$_1$ 60 may mount FS1 and map files F1–F3 to its shared memory; IPU$_2$ 62 may mount FS2 and map files F4–F6 to its shared memory; IPU$_3$ 63 may mount FS3 and FS4 and map files F7–F10 to its shared memory; and IPU$_4$ 64 may mount FS5 and FS6 and map files F11–F14 to its shared memory. Each IPU may then access only the subscriber records in the files in the filesystem(s) it has mounted. The APG services, as a whole, all the subscribers in all the files allocated to it. Subsequently, if IPU$_3$ 63 goes down, the files F7–F10 in filesystems FS3 and FS4 are redistributed to one or more of the remaining IPUs. In the example illustrated in FIG. 3A, the files in FS3 and FS4 are redistributed to IPU$_1$ 60 and IPU$_2$ 62 so that service to those subscribers having information stored in files F7–F10 may continue without interruption. Accordingly, the file distribution is reconfigured as IPUs come into service or go out of service.

As further examples, a configuration of two APGs, six filesystems used per disk in each APG, and 32 subscriber files may have an exemplary file assignment shown below:

| APG | Filesystem | Subscriber File Index |
| --- | --- | --- |
| 1 | FS1 | 0, 1, 2 |
| 1 | FS2 | 3, 4, 5 |
| 1 | FS3 | 6, 7, 8 |
| 1 | FS4 | 9, 10, 11 |
| 1 | FS5 | 12, 13 |
| 1 | FS6 | 14, 15 |
| 2 | FS7 | 16, 17, 18 |
| 2 | FS8 | 19, 20, 21 |
| 2 | FS9 | 22, 23, 24 |
| 2 | FS10 | 25, 26, 27 |
| 2 | FS11 | 28, 29 |
| 2 | FS12 | 30, 31 |

It may be seen that the 32 subscriber information files are evenly distributed to the APGs with half of the load, or 16 files, residing on the mirrored disks of each APG. If each APG has three active IPUs, then each IPU may be assigned two filesystems, which are then mounted and mapped into its shared memory. If each APG has four IPUs, then two of the IPUs may be assigned two filesystems, and the remaining two may be assigned one filesystem each. One or more spare IPUs may also be included in each APG that remains in the standby mode until an IPU failure is encountered.

The personal subscriber number (PSN) or call number is used to determine the file index of the file storing the information related to that account. For example, in the above instance where the database is segmented into 32 files, a modulo or MOD 32 operation is performed on selected digits of the personal subscriber number to yield the subscriber file index. For most applications, the last four or five digits of the personal subscriber number may be used in the MOD operation to yield the file index.

To support 3–4 million subscribers, for example, the subscriber information database may be segmented into 128 files. If five APGs are used to support the system, an exemplary file assignment is shown below.

| APG | Filesystem | Subscriber File Index |
| --- | --- | --- |
| 1 | FS1 | 0, 1, 2, 3, 4, 5 |
| 1 | FS2 | 6, 7, 8, 9, 10, 11 |
| 1 | FS3 | 12, 13, 14, 15, 16, 17 |
| 1 | FS4 | 18, 19 |
| 1 | FS5 | 20, 21 |
| 1 | FS6 | 22, 23 |
| 2 | FS7 | 24, 25, 26, 27, 28, 29 |
| 2 | FS8 | 30, 31, 32, 33, 34, 35 |
| 2 | FS9 | 36, 37, 38, 39, 40, 41, 42 |
| 2 | FS10 | 43, 44 |
| 2 | FS11 | 45, 46 |
| 2 | FS12 | 47, 48, 49 |
| 3 | FS13 | 50, 51, 52, 53, 54, 55 |
| 3 | FS14 | 56, 57, 58, 59, 60, 61 |
| 3 | FS15 | 62, 63, 64, 65, 66, 67 |
| 3 | FS16 | 68, 69 |
| 3 | FS17 | 70, 71, 72 |
| 3 | FS18 | 73, 74, 75 |
| 4 | FS19 | 76, 77, 78, 79, 80, 81 |
| 4 | FS20 | 82, 83, 84, 85, 86, 87 |
| 4 | FS21 | 88, 89, 90, 91, 92, 93 |
| 4 | FS22 | 94, 95 |
| 4 | FS23 | 96, 97, 98 |
| 4 | FS24 | 99, 100, 101 |
| 5 | FS25 | 102, 103, 104, 105, 106, 107 |
| 5 | FS26 | 108, 109, 110, 111, 112, 113 |
| 5 | FS27 | 114, 115, 116, 117, 118, 119 |

-continued

| APG | Filesystem | Subscriber File Index |
|---|---|---|
| 5 | FS28 | 120, 121 |
| 5 | FS29 | 122, 123, 124 |
| 5 | FS30 | 125, 126, 127 |

In the example above where the database is segmented into 128 files, a modulo 128 operation on the last four or five digits of the personal subscriber number may be performed to yield the file index of the file in which subscriber information of this call number is located. Therefore, information about a particular subscriber can be located quickly in the database.

It is important to note that the default or initial file assignment may be modified subsequently depending on load and traffic conditions. Each IPU maintains statistics on the number of queries it receives and reports the statistics. The file assignments may then be redistributed so that any IPU is not overworked. Details of load balancing to achieve a more even distribution is described below.

Accordingly, PM Database Manager 52 is primarily responsible for database load balancing of the IPUs in SCP 30, and APG Database Manager 54 is primarily responsible for the management of the database loads on IPUs in the respective APG. The IPUs have at least three service states: IN_SERVICE, OS_MIN, and OUT_OF_SERVICE. PM Database Manager 52, APG Database Manager 54, and IPU Database Manager 66–70 may coordinate to unmount filesystems from OS_MIN and OUT_OF_SERVICE IPUs and redistribute the filesystems to the remaining IN_SERVICE IPUs. Files may also be moved among filesystems to evenly distribute the load carried by each IPU and APG. Details on the operating states of the processes are discussed in the co-pending U.S. patent application, Ser. No. 08/526,953, titled System and Method for Multi-Site Distributed Object Management Environment, pending.

Figure 4:
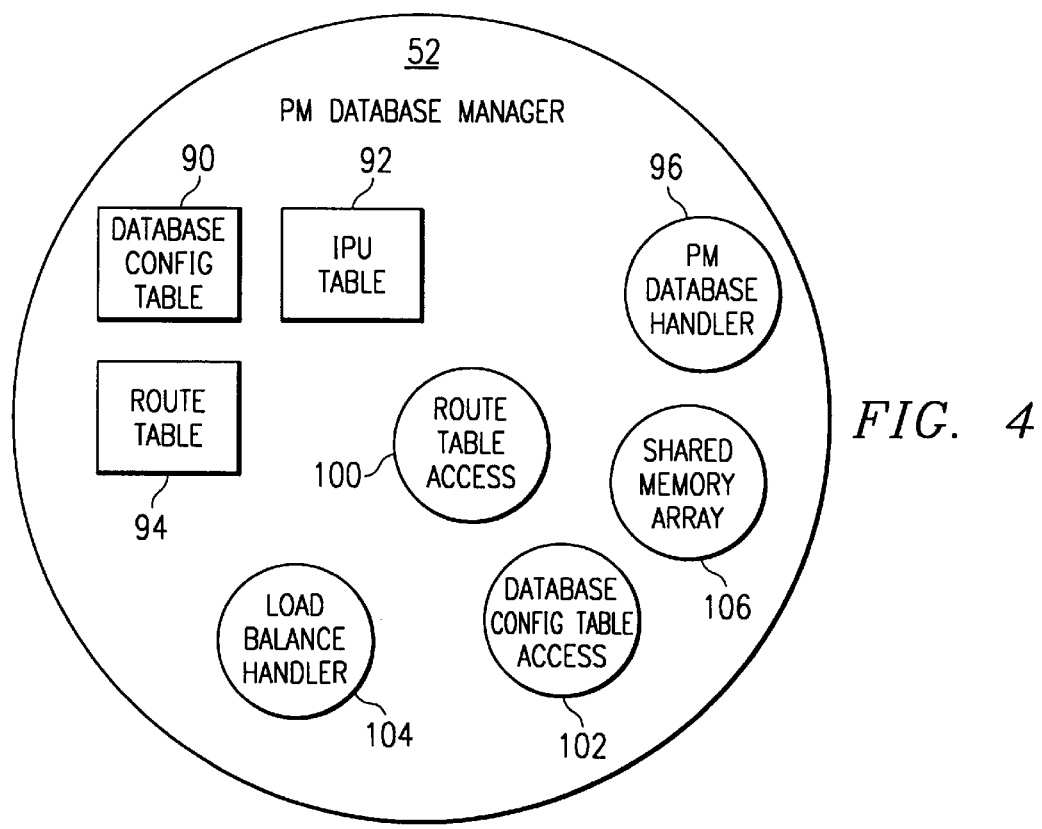
FIG. 4 is an object diagram of a Platform Manager (PM) Database Manager.

Referring to FIG. 4, a PM Database Manager 52 may include a database configuration table 90 and an IPU table 92 to handle the database configuration. Database configuration table 90 basically maintains information for each filesystem in the entire database, including:

1. filesystem name
2. default IPU name
3. current IPU name
4. APG ID
5. number of files in the filesystem
6. a map of the files in the filesystem The default IPU is the IPU that the filesystem was initially assigned to; the current IPU is the IPU that presently mounted the filesystem as affected by database reconfiguration and/or load balancing. IPU table 92 maintains information for each IPU in the system, and may include:

1. IPU name
2. APG ID
3. number of files on the IPU currently
4. number of filesystems on the IPU currently A third table, route table 94, is also maintained by PM Database Manager process 52. Route table 94 contains information for each file in the database. It is used to supply the routing information to the host, such as a Message Transport Network (MTN) (not shown) coupled to the PMs, so that the host may direct queries to the appropriate IPU depending on each IPU's database load. Route table may include:

1. subscriber file index
2. name of IPU that file is currently on
3. IPU ID

All three tables are persistent and replicated as known in the art. All updates and replications of these tables are handled by another subsystem not described in detail herein.

PM Database Manager process 52 includes a number of objects to perform the task of managing the database. A short description follows, but more detailed discussion of the function of these objects are set forth below in conjunction with references to FIGS. 7–19. As shown in FIG. 4, PM Database Handler 96 performs load balancing among the IPUs, and for handling solicited requests from the host for routing information. Route Table Access 100 and Database Config Table Access 102 are objects residing in PM Database Manager 52 that control access to route table 94 and database configuration table 90, respectively. Load Balance Handler 104 is an object that contains the processing methods for load balancing files and filesystems. Shared Memory Array 106 is an array of boolean values in shared memory 72–76 (FIG. 3) which is used to synchronize load balancing and reconfiguration between PM Database Manager 52 and APG Database Manager 54.

Figure 5:
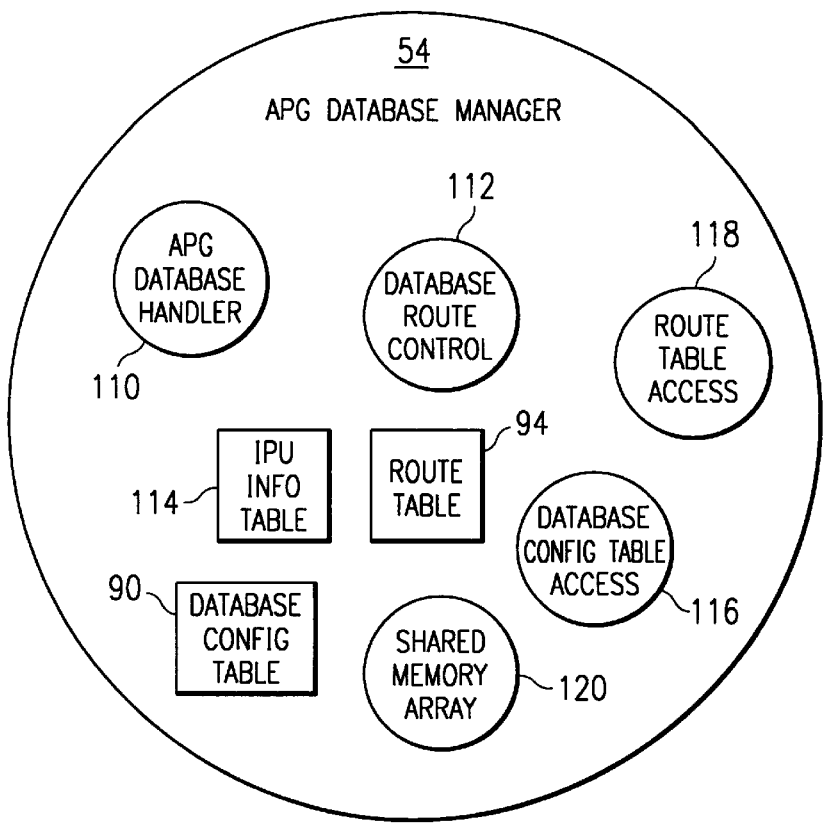
FIG. 5 is an object diagram of an Application Processor Group (APG) Database Manager.

FIG. 5 shows a typical composition of APG Database Manager 54, which may include APG Database Handler 110 for providing APG Database Manager 54 an interface to IPU Database Manager 66–70 and other processes, and further provides methods to be invoked on IPU removes and restores. Database Route Control 112 contains various processing methods for reassigning filesystems to handle different situations of IPU restores, removes, and auditing. It also contains information about the APG itself. IPU info table 114 is a table that maintains information specific to IPUs within the APG, including the current IPU service status. Similar to PM Database Manager 52, APG Database Manager 54 also includes Database Config Table 90, Database Config Table Access 116, Route Table Access 116, Route Table 94, and Shared Memory Array 120 to control access to the data in the respective table.

Figure 6:
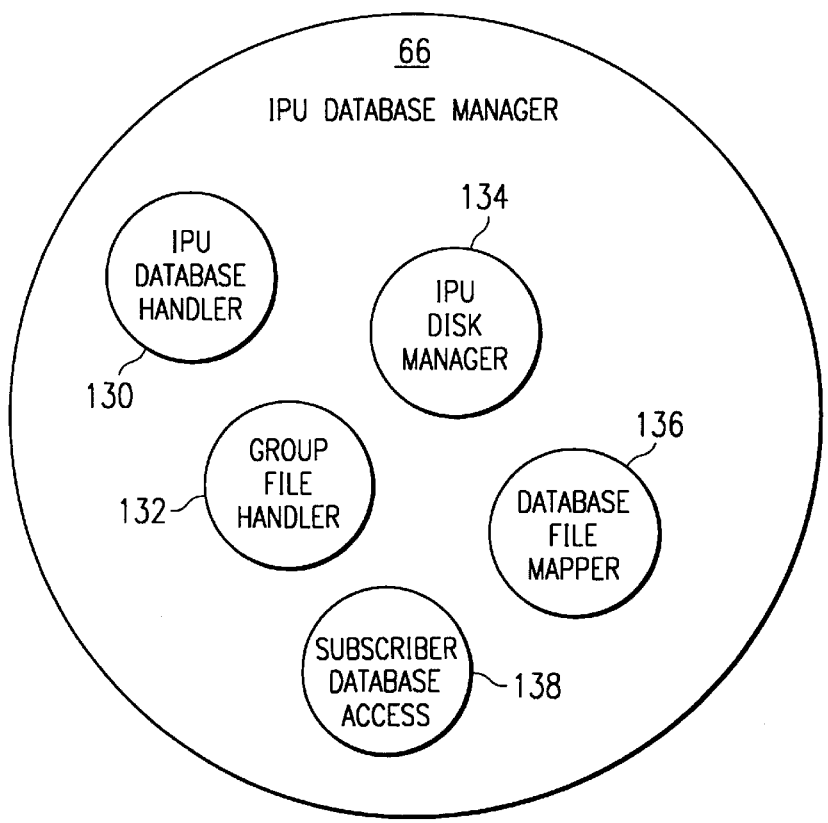
FIG. 6 is an object diagram of an Intelligent Processor Unit (IPU) Database Manager.

Referring to FIG. 6, IPU Database Manager 66 may include a number of objects, such as an IPU Database Handler 130 which provides an interface to APG Database Manager and the application processes on IPU node 60–64 (FIG. 3). IPU Database Manager 66 is also responsible indirectly for mounting and unmounting filesystems on the IPU node and mapping and unmapping the database files to and from shared memory 72 (FIG. 3). Process 66 Object 130 also communicates new database load information to the application processes on the node.

A Group File Handler 132 is an object that is responsible for periodically synchronizing the database files that are in shared memory 72 (FIG. 3) to the mirrored disks 80 and 82 (FIG. 3). An IPU Disk Manager object 134 is instantiated by IPU Database Handler 130 and is responsible for performing the mounting and unmounting of the filesystems. A Database File Mapper object 136 is responsible for mapping and unmapping files to and from shared memory. There is one Database File Mapper 136 per file on the IPU node. A Subscriber Database Access object 138 is responsible to provide processes on remote nodes access to the portion of the database handled by this particular IPU. Remote nodes include nodes residing on mate SCP 32 (FIG. 2), for example.

The operations of distributed redundant database is described in more detail by the flowcharts and block diagram in FIGS. 7–19, which are discussed in turn below. Please also refer to FIGS. 2–6, where necessary, when specific structures are discussed.

Figure 7:
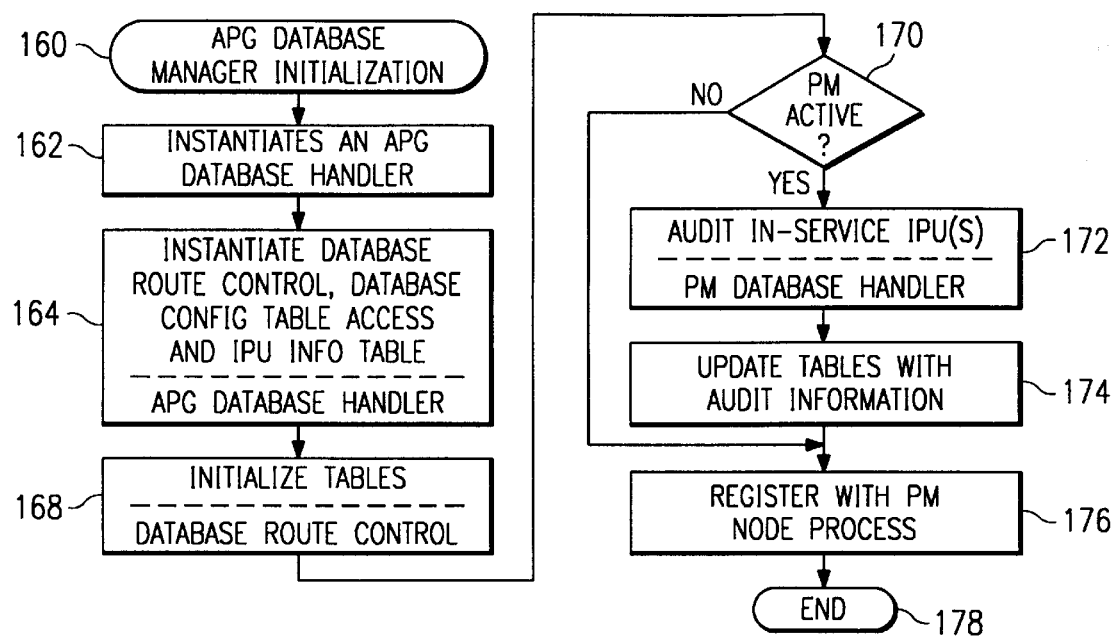
FIG. 7 is an exemplary flowchart of an APG Database Manager initialization process.

APG Database Manager 52 first instantiates an APG Database Manager 54 for each APG in the SCP. FIG. 7 is an exemplary process flow for APG Database Manager initialization beginning in block 160. First, an APG Database Handler object 110 is instantiated, as shown in block 162. In block 164, APG Database Handler 110 then instantiates Database Route Control 112, Database Config Table Access 116, and IPU Info Table 114. Database Route Control object 112 then instantiates and initializes all the tables 90–94 in APG Database Manager 52, as shown in blocks 166 and 168. If the PM is active, as determined in block 170, then an audit is performed of IN_SERVICE IPU(s) by APG Database Handler 96 in block 172. The audit yields the database load(s) of audited IPU(s), which is used to update the tables with this information, as shown in block 174. Subsequently in blocks 176 and 178, APG Database Manager 54 registers itself with the PM node process before ending the initialization process. The act of registration reveals the object's instance to other processes, so that others may communicate therewith.

Figure 8:
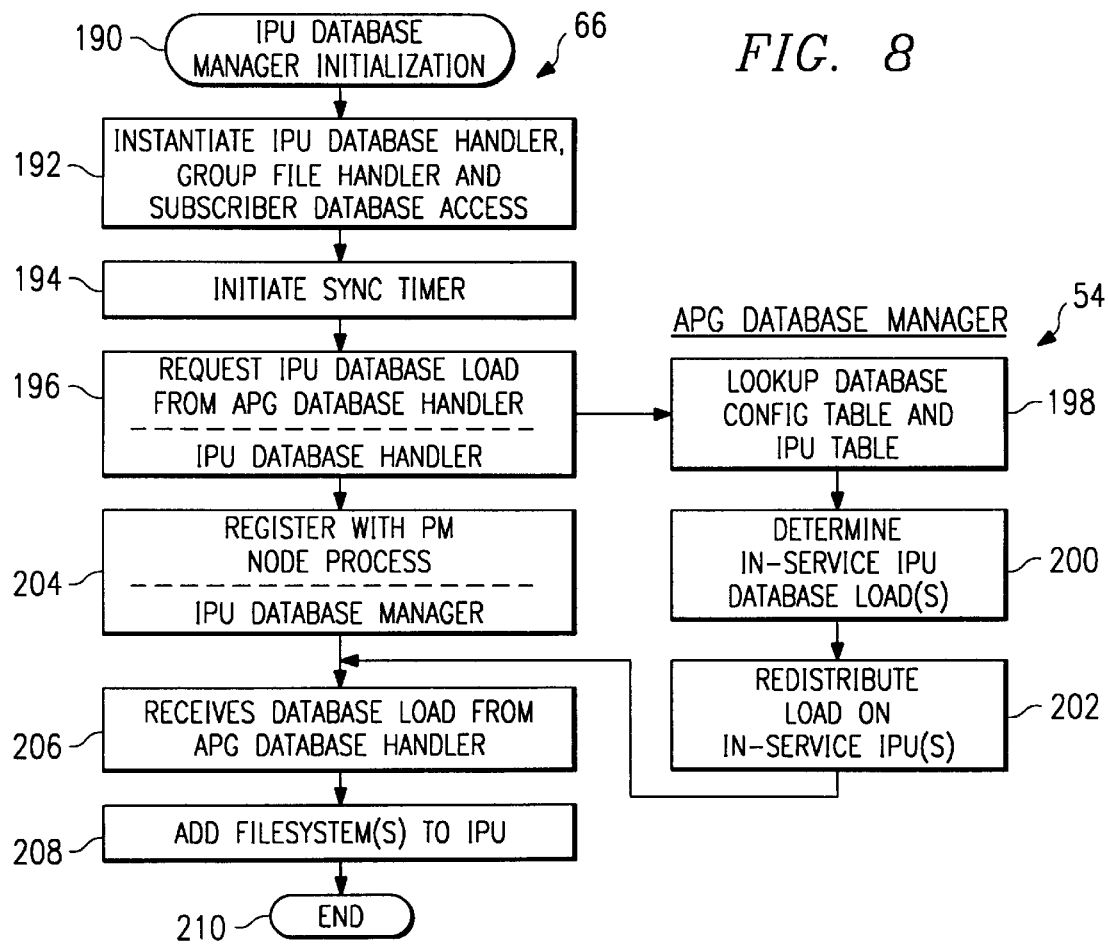
FIG. 8 is an exemplary flowchart of an IPU Database Manager initialization process.

FIG. 8 illustrates an exemplary process flow for IPU Database Manager initialization 190. In block 192, instances of IPU Database Handler 130, Group File Handler 132 and Subscriber Database Access 138 objects are instantiated. A sync timer used for shared memory-to-disk updating is initiated in block 194. IPU Database Handler 130 then requests for its share of the database load from APG Database Handler 110, as shown in block 196. In response, APG Database Manager 54 looks up database configuration and IPU tables for information on the filesystems and the requesting IPU, with this information, IN_SERVICE IPU database loads are determined based on the number of IPUs that are IN_SERVICE and traffic conditions, as shown in blocks 198 and 200. Database loads are distributed to the requesting IPU in block 202. IPU Database Manager 66 then registers itself with the PM node process, as shown in block 206. IPU Database Manager then receives the load, as shown in block 204. The filesystem(s) belonging to the portion of the database that are assigned to the IPU are then added or mounted to the IPU, as shown in block 208. The initialization process subsequently ends in block 210.

FIG. 9 shows the process flow in the APG Database Manager when a Platform Manager 34 transitions from the standby mode to the active mode, beginning in block 230. All the APG Database Managers 54 operating on the Platform Manager perform an audit of their IPU database loads, as shown in block 232. Database Route Controls 112 of each APG then initializes all tables, including database config table 90, route table 94, and IPU table 92. APG Database Handler 110 then obtains a list of IN_SERVICE IPU(S) for its APG, and queries each IN_SERVICE IPU for its database load, as shown in blocks 236 and 238. The tables are reconstructed and updated with the information supplied by the IN_SERVICE IPUs, as shown in block 240. Also dependent on this audit information, unassigned filesystem(s) are assigned to those IN_SERVICE IPU(s) that are lightly loaded, and IPU(s) with no load assigned are assigned their default database load, as shown in blocks 242 and 244. The new database load distribution results in new routing information in route table 94, which is provided to the host by APG Database Handlers 110. The standby-to-active transition process ends in block 248.

IPU failures are handled by the process flow shown in FIG. 10 beginning in block 250. In block 252, APG Database Manager 54 receives notification of an IPU failure from the PM node process. A timer is set for each failed IPU, as shown in block 254. If APG Database Manager 54 receives an IPU IN_SERVICE notification prior to the timer's expiration, as determined in block 256, then nothing more needs to be done. However, if no such notification was received, and if an IPU exit notification is received or if the timer expires, as shown in block 258, the load carried by the failed IPU is reassigned and sent to the remaining IN_SERVICE IPUs, as shown in blocks 260 and 262. If any additional IN_SERVICE IPUs fail now, as determined in block 264, execution proceeds to block 260, where the database loads are again redistributed to the remaining IN_SERVICE IPUs. If no additional IPUs fail, as determined in block 264, then Database Route Control 112 extracts updated routing information from route table 94 and APG Database Handler provides this information to the host, as shown in blocks 266 and 268. The process ends in block 270.

Figure 11:
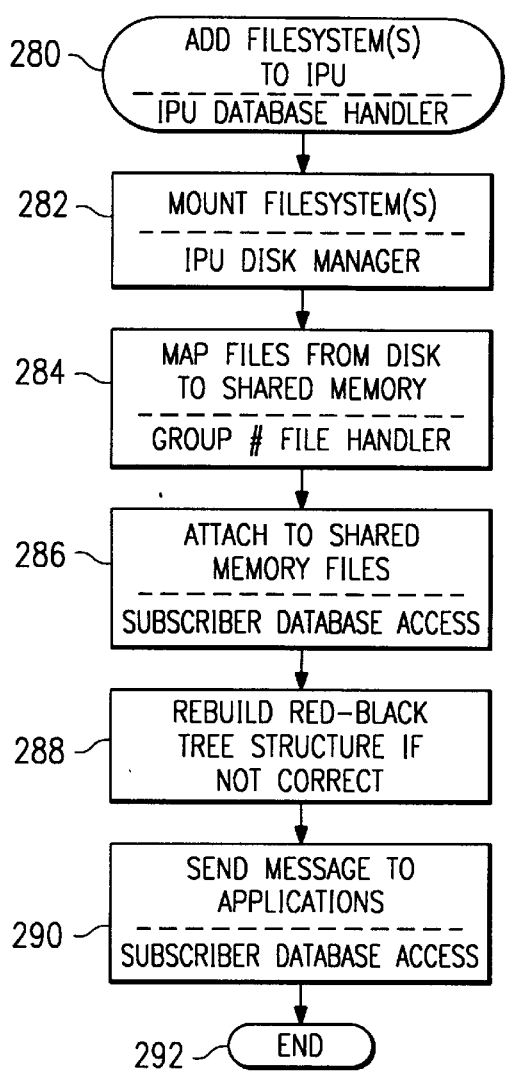
FIG. 11 is an exemplary flowchart of a process for adding filesystem(s) to an IPU.
Figure 12:
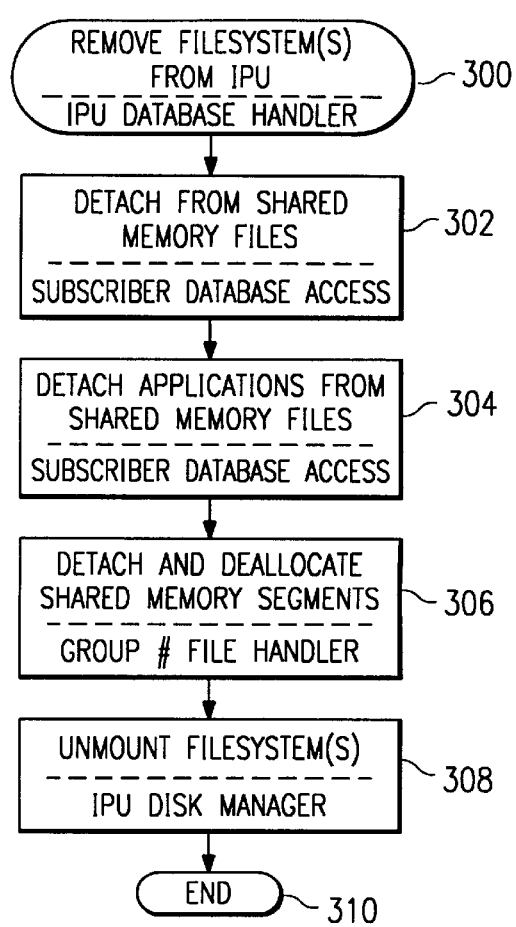
FIG. 12 is an exemplary flowchart of a process for removing filesystem(s) from an IPU.

To add filesystem(s) to an IPU, the exemplary process flow beginning in block 280 and shown in FIG. 11 may be used. IPU Disk Manager 134 mounts the filesystem(s) to be added to the appropriate IPU, as shown in block 282. The files in the mounted filesystem(s) are then mapped to shared memory by Group File Handler 132, as shown in block 284. Subscriber Database Access 138 then attaches to the shared memory files, as shown in block 286. Because records in the files are organized and searchable by accessing pointers in a Red-Black Tree data structure in the preferred embodiment, the Red-Black tree is corrected or rebuilt, if necessary. A Red-Black Tree is a balanced tree data structure that facilitates quick searches, where all the records in a file may be located by searching the nodes in the Red-Black Tree. Recall that the modulo operation yields the file index, and by searching the appropriate Red-Black Tree shared memory file, the specific record may be accessed. It is important to acknowledge that other data structures may be used without departing from the spirit of the invention. Thereafter, Subscriber Database Access 138 sends messages to all concerned applications about the new IPU file load, as shown in block 290. The process then ends in block 292.

Filesystem removal is also handled by IPU Database Handler 130, as shown in block 12 and beginning in block 300. Subscriber Database Access 138 first detaches files from the shared memory, and then detaches applications from shared memory, as shown in blocks 302 and 304. Group File Handler 132 then deallocates shared memory segments, and IPU Disk Manager 134 unmounts the filesystems(s) in question, as shown in blocks 306 and 308. The filesystem removal process ends in block 310.

It has been noted above that database loads may be balanced among the IPUs in an APG so that an even distribution of query traffic is achieved. Further, because IPUs may fail or enter into one of the non-operational states (OS_MIN or OUT_OF_SERVICE), the database loads may need to be reconfigured or redistributed to the remaining IN_SERVICE IPUs. In order to synchronize load balancing and database reconfiguration between PM Database Manager 52 and APG Database Managers 54, instances of Shared Memory Array 120 are instantiated, one is Reconfig Array, an array of booleans in shared memory, and the other is Load Balance Flag, a boolean flag also maintained in shared memory. If the database in a particular APG is being reconfigured due to one or more IPUs going down or re-entering service, the appropriate APG Database Manager 54 sets its corresponding flag in Reconfig Array. Once database reconfiguration is completed, APG Database Manager 54 resets its flag in Reconfig Array. Similarly, while load balancing is being performed, the Load Balance Flag is set by PM Database Manager 52.

Figure 13:
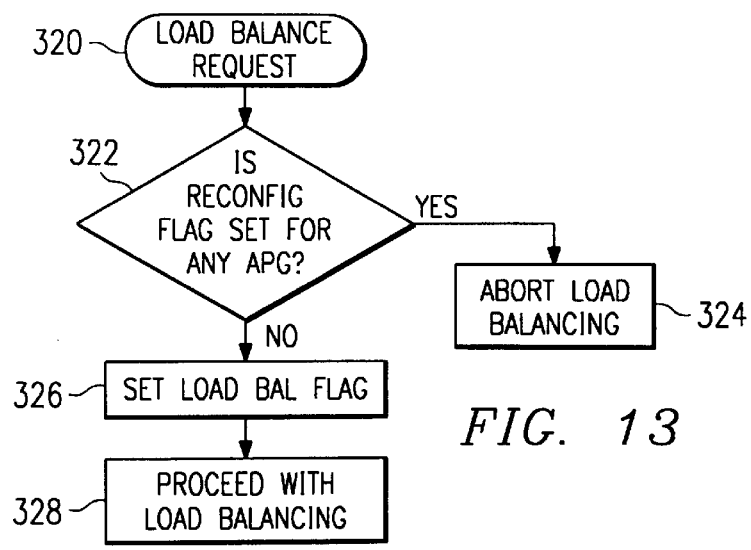
FIG. 13 is an exemplary flowchart of a load balance request process.
Figure 14:
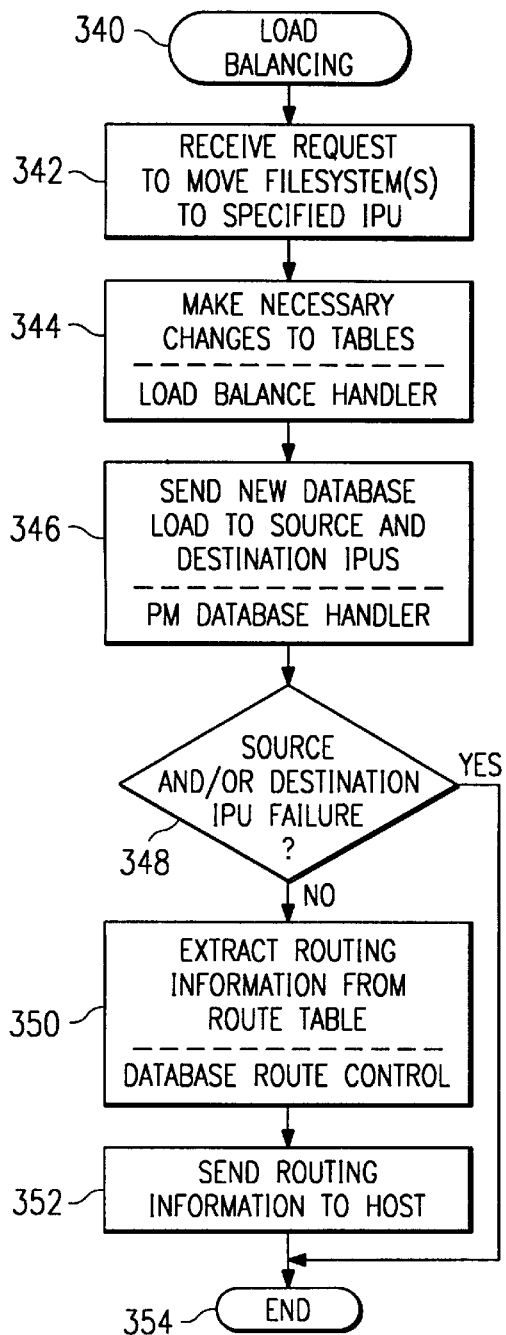
FIG. 14 is an exemplary flowchart of a load balancing process.
Figure 15:
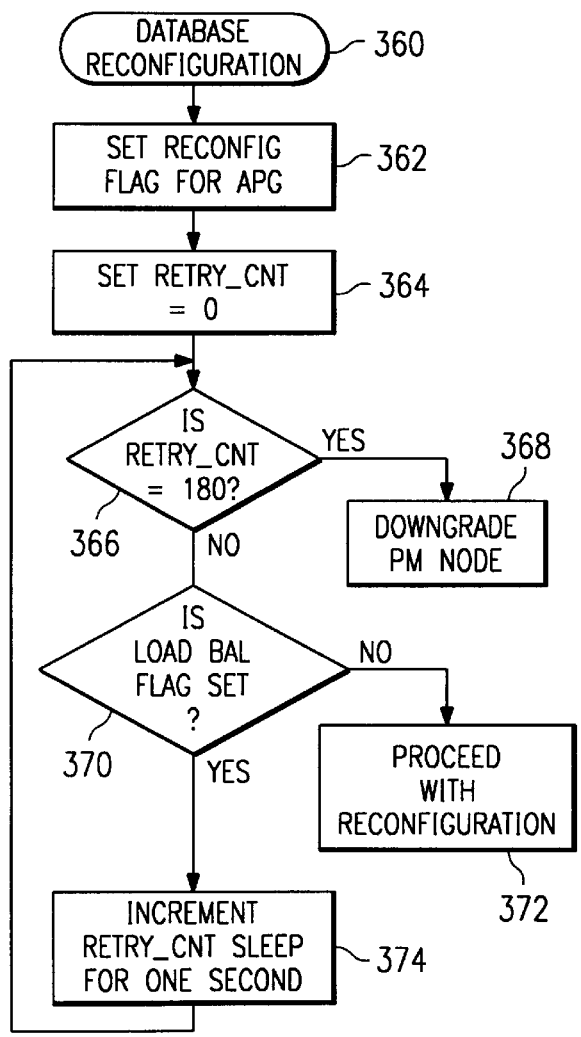
FIG. 15 is an exemplary flowchart of a database reconfiguration process.

FIGS. 13–15 are flowcharts demonstrating the process to synchronize load balancing and database reconfiguration. In FIG. 13, an exemplary load balance request process 320 is shown. A load balance may be requested by craft persons through a craft screen interface, by PM Database Manager 52, or by APG Database Manager 54. The Reconfig Array is first checked to see whether the Reconfig Flag is set for the APG in question, as shown in block 322. If the Reconfig Flag is set, then load balancing is simply aborted in block 324 and may be re-attempted at a later time. Because load balancing is not a critical operation, it is not required that load balancing waits for reconfiguration to complete, although such mechanisms may be instituted. If the Reconfig Flag for the APG is not set, then the Load Balance Flag is set, as shown in block 326, and load balancing is performed, as shown in block 328.

Load balancing is shown in exemplary flowchart in FIG. 14, beginning in block 340. A request to move one or more specific filesystems to one or more specific IPU is received, as shown in block 342. The request is likely to be generated by a craft person, or PM or APG Database Manager in view of the current load distribution and traffic conditions. In block 344, Database Route Control 112 makes the necessary changes to the tables to reflect the balanced load distribution. The new database loads are provided to both source and destination IPUs by PM Database Handler 96, as shown in block 346. If at this time it is detected that the source and/or destination IPU failed, as shown in block 348, load balancing is simply terminated in block 354. Otherwise, Database Route Control 98 extracts the new routing information from route table 94 and provides it to the host, as shown in blocks 350 and 352.

FIG. 15 shows the process flow for beginning database reconfiguration, beginning in block 360. If database reconfiguration is desired, the appropriate Reconfig Flag is set for the APG, as shown in block 362. Next, a retry counter or timer (RETRY_CNT) is reset to zero, as shown in block 364. Execution then enters a loop in which the reconfiguration process waits for load balancing to complete if it is in progress. The retry counter is first checked to see if it has reached a predetermined upper limit, for example 180, as shown in block 368. If the upper limit has been reached, it is determined that the PM node has failed and its status is downgraded to the OS_MIN state. If the retry count has not yet reached the predetermined upper limit, then the Load Balance Flag is checked to see if it is set, as shown in block 370. If it is not set, then execution may proceed with database reconfiguration. Otherwise, the retry counter is incremented and a predetermined amount of time, for example one second, is permitted to elapse before returning to the beginning of the loop at block 366.

There are several data synchronization processes taking place in distributed redundant database 10. The data stored in the shared memory of each IPU is synchronized to both mirrored disks, and all modified data in the database of each SCP is provided to its mate SCP.

Figure 16:
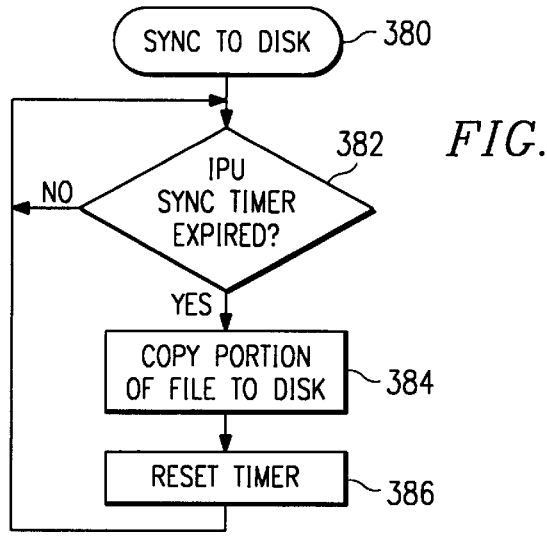
FIG. 16 is an exemplary flowchart of a shared memory and disk synchronization process.

FIG. 16 is an exemplary process flow 380 for synchronizing the data in the IPUs' shared memory 72–76 (FIG. 3) to mirrored disks 80 and 82 (FIG. 3). In block 382, the IPU sync timer is checked to determined whether it has expired. Recall that this timer was initialized during IPU Database Manager initialization, as shown in block 194 in FIG. 8. If the sync timer has not yet expired, a predetermined amount of time is permitted to elapse, and the timer is rechecked, until the sync timer is expired. The expiration of the sync timer indicates that it is time to copy a portion or block of a file in the shared memory to the mirrored disks, as shown in block 384. The sync timer is then reset, as shown in block 386, and execution returns to block 382. At the expiration of the sync timer next time, the next portion of the file is copied to disk. When an entire file has been copied, the next file is copied to disk. In this manner, all the files in the shared memory of each IPU are copied to disk. Because each IPU is assigned a different set of filesystems, the IPUs may "sync" to disk in parallel in the multi-initiated mode without interfering with each other's operations. It may be noted that this "sync" to disk process primarily updates the disks with transient data, such as subscriber current location. Static data such as adding or deleting new subscribers, service option updates, and subscriber preference data are immediately written to the mirrored disks generally simultaneously with writing the same data to the shared memory.

Figure 17:
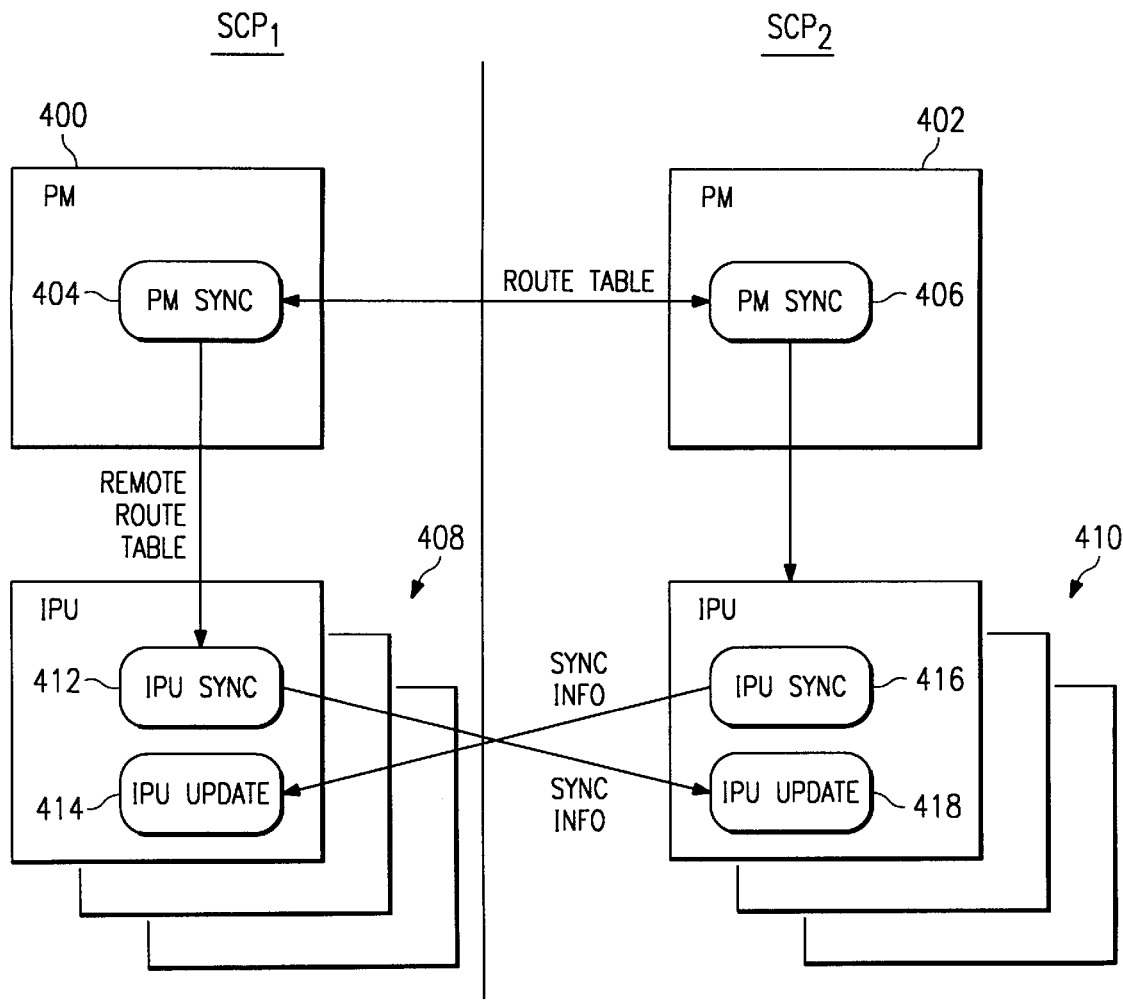
FIG. 17 is an exemplary flow diagram illustrating the process of synchronizing the databases of mate SCPs.

FIG. 17 is a simplified block diagram illustrating the process of synchronizing the databases of two mate SCPs, $SCP_1$ and $SCP_2$. Recall that the database configuration of both SCPs are identical, so that corresponding IPUs in each SCP operate on the same files and filesystems. Each SCP has an active PM 400 and 402, in which a PM sync process 404 and 406 exchanges the route table 94 (FIG. 4) with one another periodically and/or on demand when the table has been updated. The route table obtained from the mate SCP is then made available to the respective IPUs 408 and 410 via a broadcast mechanism. IPUs 408 each includes two processes, IPU sync 412 and IPU update 414 for transferring modified data to the respective IPUs in mate SCP. Similarly, IPUs 410 of $SCP_2$ also include IPU sync 416 and IPU update 418 processes for reciprocating with its own modified data.

Figure 18:
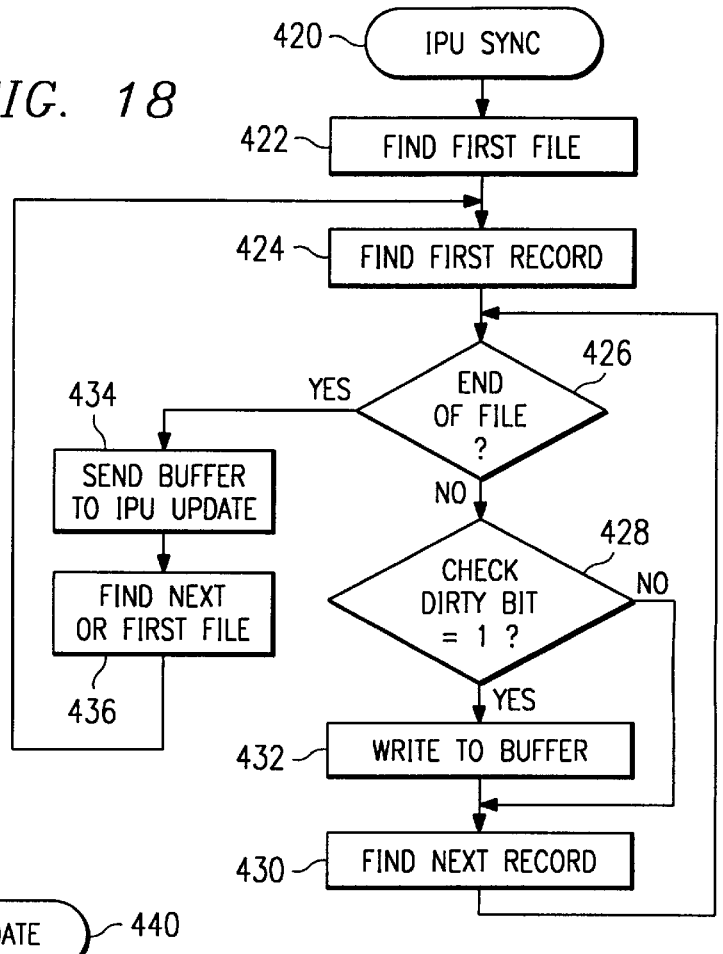
FIG. 18 is an exemplary flowchart of an IPU sync process used in synchronization of mate SCP databases.

Referring to FIG. 18, an exemplary process flow 420 for the IPU sync process is shown. In blocks 422 and 424, the first block of the file in the shared memory is located. A determination is made as to whether the end of the file (EOF) has been reached, as shown in block 426. If the end of the file has not been reached, then a dirty bit flag is checked to determine whether this record has been modified since the last synchronization effort, as shown in block 428. The dirty bit is set to 1 when the data contained in the respective record is modified. If the dirty bit is not equal to 1, indicating that the record does not contain any new or modified data, then the next record is located, as shown in block 430. However, if the dirty bit is equal to 1, reflecting the fact that the record has been modified, then the record is written to a buffer, as shown in block 432, and the next record is then located and execution returns to block 426. The dirty bit flag of the record is then reset to zero. If in block 426 it is determined that the end of the file has been reached, then the contents in the buffer is transmitted in a message to the IPU update of the corresponding IPU in the mate SCP, as shown in block 434. Next, the next file or the first file if no more files remain unprocessed is located, and execution returns to block 424. IPU sync is an endless process that continuously transfers the database contents to the mate SCP.

Figure 19:
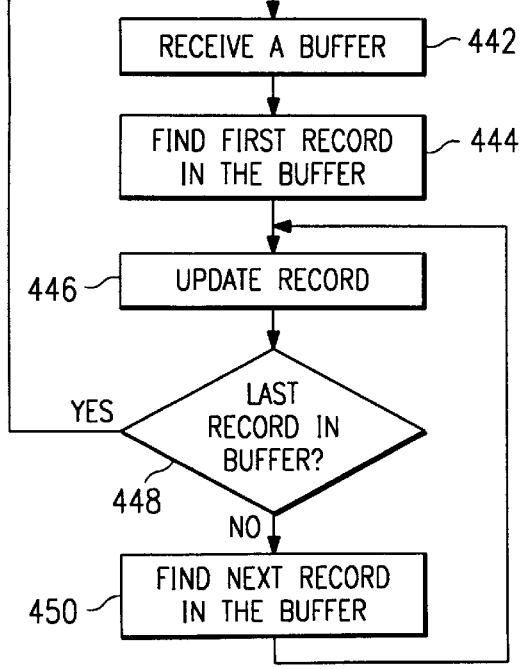
FIG. 19 is an exemplary flowchart of an IPU update process used in synchronization of mate SCP databases.

The IPU update process is shown in FIG. 19, which begins in block 440. IPU update receives the a buffer sent by IPU sync of the mate SCP, as shown in block 442. The first record in the buffer is first located, as shown in block 444. The corresponding copy of the record in the IPU is then updated with the new record, as shown in block 448. If the current record is not the last record in the buffer, as determined in block 448, then the next record in the buffer is located, as shown in block 450, and execution returns to block 446 to continue updating the remaining records in the buffer. When the last record is reached, as determined in block 446, execution returns to block 442 to process the contents of the next buffer to be received. IPU update is also an endless process that continuously copies the contents of buffers received from the mate IPU sync in the mate SCP.

In this manner, mate SCPs contain nearly identical data distributed to the IPUs in an identical manner, so that in case of failure of one SCP, the other SCP is capable of immediately servicing the subscribers of both SCPs.

Although the present invention and its advantages have been described in detail, it should be understood that various changes, substitutions and alterations can be made therein without departing from the spirit and scope of the invention as defined by the appended claims.

What is claimed is:

1. A distributed redundant database architecture for storing a plurality of files, comprising:

a first set of processors each having a shared memory, said processors being divided into processor groups, each processor of a particular processor group having access to the shared memory of each of the other processors within the particular processor group;

a memory storage device coupled to each processor group, each memory storage device being simultaneously accessible by processors in its respective processor group;

said plurality of files each having a plurality of records, and being assigned to said processor groups and further to said processors in each processor group to achieve a substantially even distribution;

said plurality of files being stored in said memory storage devices of respective assigned processor groups, and further being mapped into said respective shared memories of said processors; and a database manager associated with said processor groups for managing the distribution of said plurality files to said processors.

2. The distributed redundant database architecture, as set forth in claim 1, further comprising:

a second set of processors being physically remote from said first set of processors, and being coupled therewith, said second set of processors also being grouped into processor groups, each processor group being coupled to a memory storage device;

said plurality of files being assigned to said processor groups and further to said processors in each processor group to achieve a substantially even distribution in a similar manner as said first set of processors;

said plurality of files being stored in said memory storage devices of respective assigned processor groups, and further being mapped into said respective shared memories of said processors in a similar manner as said first set of processors; and a second database manager associated with said processor groups for managing the distribution of said plurality of files to said second set of processors.

3. The distributed redundant database architecture, as set forth in claim 2, wherein said first and second sets of processors each actively process database queries and updates associated with a different half of records stored in said plurality of files, said memory storage devices of both sets of processors each storing a copy of said plurality of files.

4. The distributed redundant database architecture, as set forth in claim 3, further comprising first and second database synchronization processes associated with said first and second sets of processors respectively for transmitting updated data in respective half of records stored in said plurality of files to one another.

5. The distributed redundant database architecture, as set forth in claim 4, wherein said updated data being transmitted between said first and second sets of processors are transient data.

6. The distributed redundant database architecture, as set forth in claim 4, further comprising:

a route table recording the file assignment of said plurality of files to processors in said first and second sets of processors; and first and second database sync managers exchanging said route tables with one another.

7. The distributed redundant database architecture, as set forth in claim 1, further comprising a database reconfiguration process executed by said database manager for redistributing said files to said processors as one or more of said processors become inactive and as inactive processors become active.

8. The distributed redundant database architecture, as set forth in claim 1, further comprising a load balancing process executed by said database manager for moving one or more selected files from one processor to another to evenly distribute the amount of processing required to service queries and updates to said plurality of files.

9. The distributed redundant database architecture, as set forth in claim 1, further comprising a memory synchronization process executed by said database manager for copying said plurality of files stored in said shared memories of said processors to its respective memory storage devices on a periodic basis.

10. The distributed redundant database architecture, as set forth in claim 1, wherein said memory storage device includes a redundant memory storage device storing a second copy of said files, both said memory storage devices being updated simultaneously.

11. The distributed redundant database architecture, as set forth in claim 1, wherein each file includes a plurality of records, each record containing information related to a subscriber of a wireless service having a personal subscriber number, each subscriber record being contained in a file having a file index equal to the result of a modulo operation on said personal subscriber number.

12. A distributed redundant database architecture for storing a plurality of files, comprising:

a first set of processors each having a shared memory, said processors being divided into processor groups;

a memory storage device coupled to each processor group, each memory storage device being simultaneously accessible by processors in its respective processor group;

said plurality of files each having a plurality of records, and being assigned to said processor groups and further to said processors in each processor group to achieve a substantially even distribution;

said plurality of files being stored in said memory storage devices of respective assigned processor groups, and further being mapped into said respective shared memories of said processors; and a database manager associated with said processor groups for managing the distribution of said plurality files to said processors, wherein each file is associated with a Red-Black Tree data structure having a plurality of nodes corresponding to a plurality of records of the file, said nodes of said Red-Black Tree being organized for speedy searches to facilitate quick location and access of corresponding records in said file.

13. A distributed redundant database architecture for storing a plurality of files, comprising:

a first set of processors each having a shared memory, said processors being divided into processor groups;

a memory storage device coupled to each processor group, each memory storage device being simultaneously accessible by processors in its respective processor group;

said plurality of files each having a plurality of records, and being assigned to said processor groups and further to said processors in each processor group to achieve a substantially even distribution;

said plurality of files being stored in said memory storage devices of respective assigned processor groups, and further being mapped into said respective shared memories of said processors; and a database manager associated with said processor groups for managing the distribution of said plurality files to said processors, wherein said memory storage devices are multi-port disks.

14. A distributed redundant database architecture for storing a plurality of files, comprising:

a first set of processors each having a shared memory, said processors being divided into processor groups;

a memory storage device coupled to each processor group, each memory storage device being simultaneously accessible by processors in its respective processor group;

said plurality of files each having a plurality of records, and being assigned to said processor groups and further to said processors in each processor group to achieve a substantially even distribution;

said plurality of files being stored in said memory storage devices of respective assigned processor groups, and further being mapped into said respective shared memories of said processors; and a database manager associated with said processor groups for managing the distribution of said plurality files to said processors, wherein said memory storage devices are coupled in a multi-initiator mode with said processor group.

15. A distributed redundant database architecture for storing a plurality of files, comprising:

a first set of processors each having a shared memory, said processors being divided into processor groups;

a memory storage device coupled to each processor group, each memory storage device being simultaneously accessible by processors in its respective processor group;

said plurality of files each having a plurality of records, and being assigned to said processor groups and further to said processors in each processor group to achieve a substantially even distribution;

said plurality of files being stored in said memory storage devices of respective assigned processor groups, and further being mapped into said respective shared memories of said processors; and a database manager associated with said processor groups for managing the distribution of said plurality files to said processors, wherein said memory storage device is partitioned into X filesystems, said files being generally evenly distributed among said filesystems.

16. The distributed redundant database architecture, as set forth in claim 15, wherein each file includes a plurality of records, each record containing information related to a subscriber of a wireless service having a personal subscriber number, said file having a file index being equal to the result of a modulo Y operation on said personal subscriber number, where Y is the total number of subscriber files.

17. A distributed redundant database architecture for a wireless communications network, comprising:

first and second service control points, each service control point servicing one half of wireless service subscribers, each service control point including:

a first set of processors each having a shared memory, said processors being divided into processor groups, each processor of a particular processor group having access to the shared memory of each of the other processors within the particular processor group, said processors of said processor groups being assigned subscriber files having records containing subscriber information, said files being substantially evenly distributed among said processors in each processor group;

a pair of mirrored memory storage devices coupled to each processor group, each pair of mirrored memory storage device being accessible by its respective processor group;

said subscriber files being stored in said pairs of mirrored memory storage devices of respective assigned processor groups, and further being mapped into said respective shared memories of said processors; and a database manager associated with said processor groups for managing the distribution of said files to said processors.

18. The distributed redundant database architecture, as set forth in claim 17, further comprising:

a route table recording the file assignment of said subscriber files to processors in said first and second service control points; and first and second database sync processes in respective service control points exchanging said route tables with one another.

19. The distributed redundant database architecture, as set forth in claim 17, further comprising a database reconfiguration process executed by said database manager for redistributing said subscriber files to said processors as one or more of said processors become inactive or one or more inactive processors become active.

20. The distributed redundant database architecture, as set forth in claim 17, further comprising a load balancing process executed by said database manager for moving one or more selected subscriber files from one processor to another to evenly distribute the amount of processing required to service queries and updates to said plurality of subscriber files.

21. The distributed redundant database architecture, as set forth in claim 17, further comprising a memory synchronization process executed by said database manager for copying said plurality of subscriber files stored in said shared memories of said processors to its respective pairs mirrored memory storage devices on a periodic basis.

22. The distributed redundant database architecture, as set forth in claim 17, wherein each subscriber file includes a plurality of records, each record containing information related to a wireless service subscriber having a personal subscriber number, said record of said subscriber being stored in a subscriber file having a file index equal to the result of a modulo operation on said personal subscriber number.

23. A distributed redundant database architecture for a wireless communications network, comprising:

first and second service control points, each service control point servicing one half of wireless service subscribers, each service control point including:

a first set of processors each having a shared memory, said processors being divided into processor groups, said processors of said processor groups being assigned subscriber files having records containing subscriber information, said files being substantially evenly distributed among said processors in each processor group;

a pair of mirrored memory storage devices coupled to each processor group, each pair of mirrored memory storage device being accessible by its respective processor group;

said subscriber files being stored in said pairs of mirrored memory storage devices of respective assigned processor groups, and further being mapped into said respective shared memories of said processors; and a database manager associated with said processor groups for managing the distribution of said files to said processors; and first and second database synchronization processes associated with said first and second service control points respectively for transmitting updated transient data, such as subscriber location, in said subscriber files to one another.

24. A distributed redundant database architecture for a wireless communications network, comprising:

first and second service control points, each service control point servicing one half of wireless service subscribers, each service control point including:

a first set of processors each having a shared memory, said processors being divided into processor groups, said processors of said processor groups being assigned subscriber files having records containing subscriber information, said files being substantially evenly distributed among said processors in each processor group;

a pair of mirrored memory storage devices coupled to each processor group, each pair of mirrored memory storage device being accessible by its respective processor group;

said subscriber files being stored in said pairs of mirrored memory storage devices of respective assigned processor groups, and further being mapped into said respective shared memories of said processors; and a database manager associated with said processor groups for managing the distribution of said files to said processors, wherein each subscriber file is associated with a Red-Black Tree data structure having a plurality of nodes corresponding to a plurality of records of the subscriber file, said nodes of said Red-Black Tree being organized for speedy searches to facilitate quick location and access of corresponding records in said subscriber file.

25. A distributed redundant database architecture for a wireless communications network, comprising:

first and second service control points, each service control point servicing one half of wireless service subscribers, each service control point including:

a first set of processors each having a shared memory, said processors being divided into processor groups, said processors of said processor groups being assigned subscriber files having records containing subscriber information, said files being substantially evenly distributed among said processors in each processor group;

a pair of mirrored memory storage devices coupled to each processor group, each pair of mirrored memory storage device being accessible by its respective processor group;

said subscriber files being stored in said pairs of mirrored memory storage devices of respective assigned processor groups, and further being mapped into said respective shared memories of said processors; and a database manager associated with said processor groups for managing the distribution of said files to said processors, wherein said mirrored memory storage devices are multi-port disks.

26. A distributed redundant database architecture for a wireless communications network, comprising:

first and second service control points, each service control point servicing one half of wireless service subscribers, each service control point including:

a first set of processors each having a shared memory, said processors being divided into processor groups, said processors of said processor groups being assigned subscriber files having records containing subscriber information, said files being substantially evenly distributed among said processors in each processor group;

a pair of mirrored memory storage devices coupled to each processor group, each pair of mirrored memory storage device being accessible by its respective processor group;

said subscriber files being stored in said pairs of mirrored memory storage devices of respective assigned processor groups, and further being mapped into said respective shared memories of said processors; and a database manager associated with said processor groups for managing the distribution of said files to said processors, wherein said mirrored memory storage devices are coupled to said processors in each processor group in a multi-initiator mode.

27. A distributed redundant database architecture for a wireless communications network, comprising:

first and second service control points, each service control point servicing one half of wireless service subscribers, each service control point including:

a first set of processors each having a shared memory, said processors being divided into processor groups, said processors of said processor groups being assigned subscriber files having records containing subscriber information, said files being substantially evenly distributed among said processors in each processor group;

a pair of mirrored memory storage devices coupled to each processor group, each pair of mirrored memory storage device being accessible by its respective processor group;

said subscriber files being stored in said pairs of mirrored memory storage devices of respective assigned processor groups, and further being mapped into said respective shared memories of said processors; and a database manager associated with said processor groups for managing the distribution of said files to said processors, wherein said mirrored memory storage devices are each partitioned into X filesystems, said files being generally evenly distributed among said filesystems.

28. The distributed redundant database architecture, as set forth in claim 27, further comprising a database reconfiguration process for redistributing said filesystems among said processors in a processor group in the event one or more processors in said processor group becomes inactive or one or more inactive processors become active.

29. The distributed redundant database architecture, as set forth in claim 27, wherein each file includes a plurality of records, each record containing information related to a subscriber of a wireless service having a personal subscriber number, said file having a file index being equal to the result of a modulo Y operation on said personal subscriber number, where Y is the total number of subscriber files.

30. A method for organizing data storage and access in a database, comprising the steps of:

organizing data in said database into a plurality of files, each file having a file index and contain a plurality of records;

providing a first set of processors and dividing said processors into processor groups, each processor group coupled to a memory storage device, each processor within a particular processor group having a shared memory that is accessible by every other processor within the particular processor group;

assigning said plurality of files to said processor groups and further to said processors in each processor group in an evenly distributed manner; and storing said assigned files in said memory storage device of each processor group according to said assignment, and mapping said files assigned to each processor from said memory storage device to the shared memory of each processor.

31. The method, as set forth in claim 30, further comprising the steps of:

receiving database queries with reference to specific files;

consulting a route table for file assignment to processors; and routing said received database queries to processors assigned to said specific files.

32. The method, as set forth in claim 30, further comprising the steps of:

receiving data updates with reference to specific files;

consulting a route table for file assignment to processors; and updating data stored in said shared memory of said processors assigned to said specific files.

33. The method, as set forth in claim 32, further comprising the steps of updating data stored in said memory storage device with data stored in said shared memories of each processor in said respective processor group.

34. The method, as set forth in claim 30, further comprising the steps of:

receiving data updates with reference to specific files;

consulting a route table for file assignment to processors; and updating data stored in said shared memory of said processors assigned to said specific files and said respective memory storage device of the processor group.

35. The method, as set forth in claim 30, further comprising the step of auditing said processors to determine file assignments thereto.

36. The method, as set forth in claim 30, further comprising the steps of:

detecting one or more processors going inactive; and reconfiguring the distribution of files to remaining active processors.

37. The method, as set forth in claim 30, further comprising the steps of:

monitoring data access and update traffic being processed by each processor; and moving one or more files among said processors to balance the traffic load on the processors.

38. The method, as set forth in claim 30, further comprising the steps of:

providing a backup memory storage device as a mirror device for each memory storage device; and performing all data updates to both memory storage devices.

39. The method, as set forth in claim 30, further comprising the steps of:

providing a second set of processors and dividing said processors into processor groups, each processor group coupled to a memory storage device;

assigning said plurality of files to said processor groups and further to said processors in each processor group in an evenly distributed manner as in said first set of processors; and storing said assigned files in said memory storage device of each processor group according to said assignment, and mapping said files assigned to each processor from said memory storage device to a shared memory of each processor.

40. The method, as set forth in claim 30, further comprising the steps of synchronizing the data stored in shared memories of said first and second sets of processors.

41. The method, as set forth in claim 40, wherein the data synchronizing step further comprises the steps of exchanging data updates to said files.

42. The method, as set forth in claim 30, further comprising the steps of:

detecting one or more processors going inactive;

reconfiguring the distribution of files to remaining active processors;

monitoring data access and update traffic being processed by each processor;

moving one or more files among said processors to balance the traffic load on the processors; and coordinating said reconfiguration and file moving steps.

43. The method, as set forth in claim 30, further comprising the steps of:

detecting one or more inactive processors becoming active; and reconfiguring the distribution of files to said newly active processors.

44. A method for organizing data storage and access in a database, comprising the steps of:

organizing data in said database into a plurality of files, each file having a file index and contain a plurality of records;

providing a first set of processors and dividing said processors into processor groups, each processor group coupled to a memory storage device;

assigning said plurality of files to said processor groups and further to said processors in each processor group in an evenly distributed manner; and storing said assigned files in said memory storage device of each processor group according to said assignment, and mapping said files assigned to each processor from said memory storage device to a shared memory of each processor;

receiving data updates with reference to specific files;

consulting a route table for file assignment to processors; and updating data stored in said shared memory of said processors assigned to said specific files;

updating data stored in said memory storage device with data stored in said shared memories of each processor in said respective processor group, wherein said data updating step includes the steps of:

initializing a synchronization timer;

copying at least a portion of a file at the expiration of said synchronization timer to said memory storage device; and resetting said synchronization timer and repeating said copying and timer resetting steps to copy all files.

45. A method for organizing data storage and access in a database, comprising the steps of:

organizing data in said database into a plurality of files, each file having a file index and contain a plurality of records;

providing a first set of processors and dividing said processors into processor groups, each processor group coupled to a memory storage device;

assigning said plurality of files to said processor groups and further to said processors in each processor group in an evenly distributed manner;

storing said assigned files in said memory storage device of each processor group according to said assignment, and mapping said files assigned to each processor from said memory storage device to a shared memory of each processor;

synchronizing the data stored in shared memories of said first and second sets of processors;

marking each record containing modified data as dirty as the data is being modified, said files having a plurality of records;

transferring a copy of all dirty record of all the files to a buffer; and transmitting the buffer to said second set of processors.

46. The method, as set forth in claim 45, wherein said transferring step includes the step of transferring records of files serviced by each processor individually, and said transmitting step includes the step of transmitting said buffer to a corresponding processor in said second set of processors.

47. A method for organizing data storage and access in a database, comprising the steps of:

organizing data in said database into a plurality of files, each file having a file index and contain a plurality of records;

providing a first set of processors and dividing said processors into processor groups, each processor group coupled to a memory storage device;

assigning said plurality of files to said processor groups and further to said processors in each processor group in an evenly distributed manner; and storing said assigned files in said memory storage device of each processor group according to said assignment, and mapping said files assigned to each processor from said memory storage device to a shared memory of each processor;

associating a file index with each file;

storing information on a wireless service subscriber in a record in one of said files;

associating a personal subscriber number with said wireless service subscriber; and performing a modulo operation on said personal subscriber number to compute for said file index thereof.

48. A method for organizing data storage and access in a database, comprising the steps of:

organizing data in said database into a plurality of files, each file having a file index and contain a plurality of records;

providing a first set of processors and dividing said processors into processor groups, each processor group coupled to a memory storage device;

assigning said plurality of files to said processor groups and further to said processors in each processor group in an evenly distributed manner; and storing said assigned files in said memory storage device of each processor group according to said assignment, and mapping said files assigned to each processor from said memory storage device to a shared memory of each processor;

associating each record of a file with a node in a Red-Black Tree data structure; and searching among nodes of said Red-Black Tree data structure to locate a specific record.

49. The method, as set forth in claim 48, wherein said associating step comprises the step of defining a pointer in each node for pointing at respective records.

\* \* \* \* \*